(12) United States Patent
Weisberger et al.

(10) Patent No.: US 12,354,458 B2
(45) Date of Patent: Jul. 8, 2025

(54) SYSTEMS, METHODS, AND APPARATUSES FOR USING AN ANOMALY DETERRENT SENSOR WITHIN A SELF-SERVICE MACHINE FOR DISPENSING PHYSICAL ITEMS

(71) Applicant: BANK OF AMERICA CORPORATION, Charlotte, NC (US)

(72) Inventors: Andrea M. Weisberger, Jacksonville, FL (US); Divya Ilango Arun, Concord, NC (US); Bryan King, Huntersville, NC (US); Jitesh K. Vijay, Princeton, NJ (US); Kristi A. Perry-Weaver, Waxahachie, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 18/369,379

(22) Filed: Sep. 18, 2023

(65) Prior Publication Data
US 2025/0095471 A1   Mar. 20, 2025

(51) Int. Cl.
*G08B 29/12* (2006.01)
*G08B 21/18* (2006.01)

(52) U.S. Cl.
CPC .................................. *G08B 21/18* (2013.01)

(58) Field of Classification Search
USPC .......... 340/514, 516, 525, 526, 534, 538.15, 340/539.1, 539.22, 539.32, 568.2, 572.1, 340/582, 588, 679, 680, 683, 693.2, 340/693.8, 3.43, 825.23, 5.91, 5.92, 340/815.45
See application file for complete search history.

(56) References Cited

U.S. PATENT DOCUMENTS

| | | | |
|---|---|---|---|
| 6,553,100 B1 * | 4/2003 | Chen ...................... | G08B 25/14 379/37 |
| 7,347,361 B2 | 3/2008 | Lovett | |
| 7,350,697 B2 * | 4/2008 | Swift ..................... | G06Q 20/24 705/16 |
| 7,392,942 B2 | 7/2008 | Dragt et al. | |
| 7,611,046 B2 | 11/2009 | Ahles et al. | |

(Continued)

*Primary Examiner* — Daniel Previl
(74) *Attorney, Agent, or Firm* — Moore & Van Allen PLLC; Nicholas C. Russell

(57) ABSTRACT

Systems, computer program products, and methods are described herein for using an anomaly deterrent sensor within a self-service machine for dispensing physical items. The present disclosure is configured to: detect an interaction between a payment instrument with available resources and a self-service machine for dispensing physical items; receive an anomaly notification from an anomaly deterrent sensor within the self-service machine for dispensing physical items wherein the anomaly notification is associated with forced entry into the self-service machine, wherein the anomaly deterrent sensor detects forced entry into a physical item dispensing area within the self-service machine during the interaction between the payment instrument and self-service machine; and trigger a set of security measures associated with the self-service machine for dispensing physical items upon reception of the anomaly notification originating from the anomaly deterrent sensor, wherein the set of security measures comprises playing a pre-recorded alarm.

20 Claims, 4 Drawing Sheets

(56) References Cited

U.S. PATENT DOCUMENTS

| | | |
|---|---|---|
| 7,627,525 B2 | 12/2009 | Williams |
| 7,780,077 B1 | 8/2010 | Kay et al. |
| 7,991,696 B2 | 8/2011 | Gustin et al. |
| 8,038,056 B2 | 10/2011 | Ramachandran et al. |
| 8,719,929 B2* | 5/2014 | Le .................... G07F 19/207 |
| | | 726/22 |
| 9,245,270 B2 | 1/2016 | Joao |
| 9,911,114 B2 | 3/2018 | Rackley, III et al. |
| 11,257,072 B1* | 2/2022 | Aument ................. G07F 7/088 |
| 2006/0284732 A1* | 12/2006 | Brock-Fisher ........ A61B 5/1112 |
| | | 600/300 |
| 2020/0399752 A1* | 12/2020 | Chu ..................... C23C 14/566 |
| 2023/0077868 A1* | 3/2023 | Burns .................. B60R 25/305 |
| | | 348/148 |

\* cited by examiner

SYSTEMS, METHODS, AND APPARATUSES FOR USING AN ANOMALY DETERRENT SENSOR WITHIN A SELF-SERVICE MACHINE FOR DISPENSING PHYSICAL ITEMS

TECHNOLOGICAL FIELD

Example embodiments of the present disclosure relate to using an anomaly deterrent sensor within a self-service machine for dispensing physical items.

BACKGROUND

The occurrence of an anomaly has been known to cause self-service machines to deviate from the intended established procedure. Said anomalies may be caused through malicious activities, therefore detection and deterrence of these malicious activities may reduce the number of deviations from established procedure. Applicant has identified a number of deficiencies and problems associated with an anomaly deterrent sensor within a self-service machine for dispensing physical items. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for using an anomaly deterrent sensor within a self-service machine for dispensing physical items.

In an example embodiment, a system for using an anomaly deterrent sensor within a self-service machine for dispensing physical items is provided. The system may include at least one non-transitory storage device and at least one processing device coupled to the at least one non-transitory storage device. The at least one processing device may be configured to detect an interaction between a payment instrument with available resources and a self-service machine for dispensing physical items. The at least one processing device may further be configured to receive an anomaly notification from an anomaly deterrent sensor within the self-service machine for dispensing physical items. The anomaly notification may be associated with forced entry into the self-service machine for dispensing physical items. The anomaly deterrent sensor may detect forced entry into a physical item dispensing area within the self-service machine for dispensing physical items during the interaction between the payment instrument and the self-service machine. The at least one processing device may further be configured to trigger a set of security measures associated with the self-service machine for dispensing physical items upon reception of the anomaly notification originating from the anomaly deterrent sensor. The set of security measures may include playing a pre-recorded alarm from the self-service machine for dispensing physical items after reception of the anomaly notification from the anomaly deterrent sensor.

In various embodiments, the set of security measures may further include triggering an entry way associated with the self-service machine to lock.

In various embodiments, the set of security measures may further include transmitting a notification regarding forced entry of the self-service machine for dispensing physical items to a third party.

In various embodiments, the set of security measures may further include activating a camera system associated with the self-service machine.

In various embodiments, the set of security measures may further be reset upon detection of a change found through the camera system.

In various embodiments, the set of security measures are implemented for a predetermined length of time after being triggered by reception of the anomaly notification from the anomaly deterrent sensor within the self-service machine.

In some embodiments, the anomaly deterrent sensor may be comprised of a vibrational sensor.

In another example embodiment, a computer program product for using an anomaly deterrent sensor within a self-service machine for dispensing physical items is provided. The computer program product includes a non-transitory computer-readable medium comprising code causing an apparatus to detect an interaction between a payment instrument with available resources and a self-service machine for dispensing physical items. The computer readable medium comprising code further causing an apparatus to receive an anomaly notification from an anomaly deterrent sensor within the self-service machine for dispensing physical items. The anomaly notification may be associated with forced entry into the self-service machine for dispensing physical items. The anomaly deterrent sensor may detect forced entry into a physical item dispensing area within the self-service machine for dispensing physical items during the interaction between the payment instrument and the self-service machine. The computer readable medium comprising code further causes an apparatus to trigger a set of security measures associated with the self-service machine for dispensing physical items upon reception of the anomaly notification originating from the anomaly deterrent sensor. The set of security measures may comprise playing a pre-recorded alarm from the self-service machine for dispensing physical items after reception of the anomaly notification from the anomaly deterrent sensor.

In various embodiments, the set of security measures may further include triggering an entry way associated with the self-service machine to lock.

In various embodiments, the set of security measures may further include transmitting a notification regarding forced entry of the self-service machine for dispensing physical items to a third party.

In various embodiments, the set of security measures further includes activating a camera system associated with the self-service machine.

In various embodiments, the set of security measures may further be reset upon detection of a change found through the camera system.

In various embodiments, the set of security measures may be implemented for a predetermined length of time after being triggered by reception of the anomaly notification from the anomaly deterrent sensor within the self-service machine.

In various embodiments, the anomaly deterrent sensor may be comprised of a vibrational sensor.

In another example embodiment, a computer-implemented method for using anomaly deterrent sensor within a self-service machine for dispensing physical items is provided. The method includes detecting an interaction between a payment instrument with available resources and a self-service machine for dispensing physical items. The method may also include receiving an anomaly notification from an anomaly deterrent sensor with the self-service machine for dispensing physical items. The anomaly notification may be associated with forced entry into the self-service machine for dispensing physical items. The anomaly deterrent sensor may detect forced entry into a physical item dispensing area within the self-service machine for dispensing physical items during the interaction between the payment instrument and the self-service machine. The method may also include triggering a set of security measures associated with the self-service machine for dispensing physical items upon reception of the anomaly notification originating from the anomaly deterrent sensor. The set of security measures may comprise playing a pre-recorded alarm from the self-service machine for dispensing physical items after reception of the anomaly notification from the anomaly deterrent sensor.

In various embodiments, the set of security measures may further include triggering an entry way associated with the self-service machine to lock.

In various embodiments, the set of security measures may further include transmitting a notification regarding forced entry of the self-service machine for dispensing physical items to a third party.

In various embodiments, the set of security measures may further include activating a camera system associated with the self-service machine.

In various embodiments, the set of security measures may be implemented for a predetermined length of time after being triggered by reception of the anomaly notification from the anomaly deterrent sensor within the self-service machine.

In some embodiments, the anomaly deterrent sensor may be comprised of a vibrational sensor.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
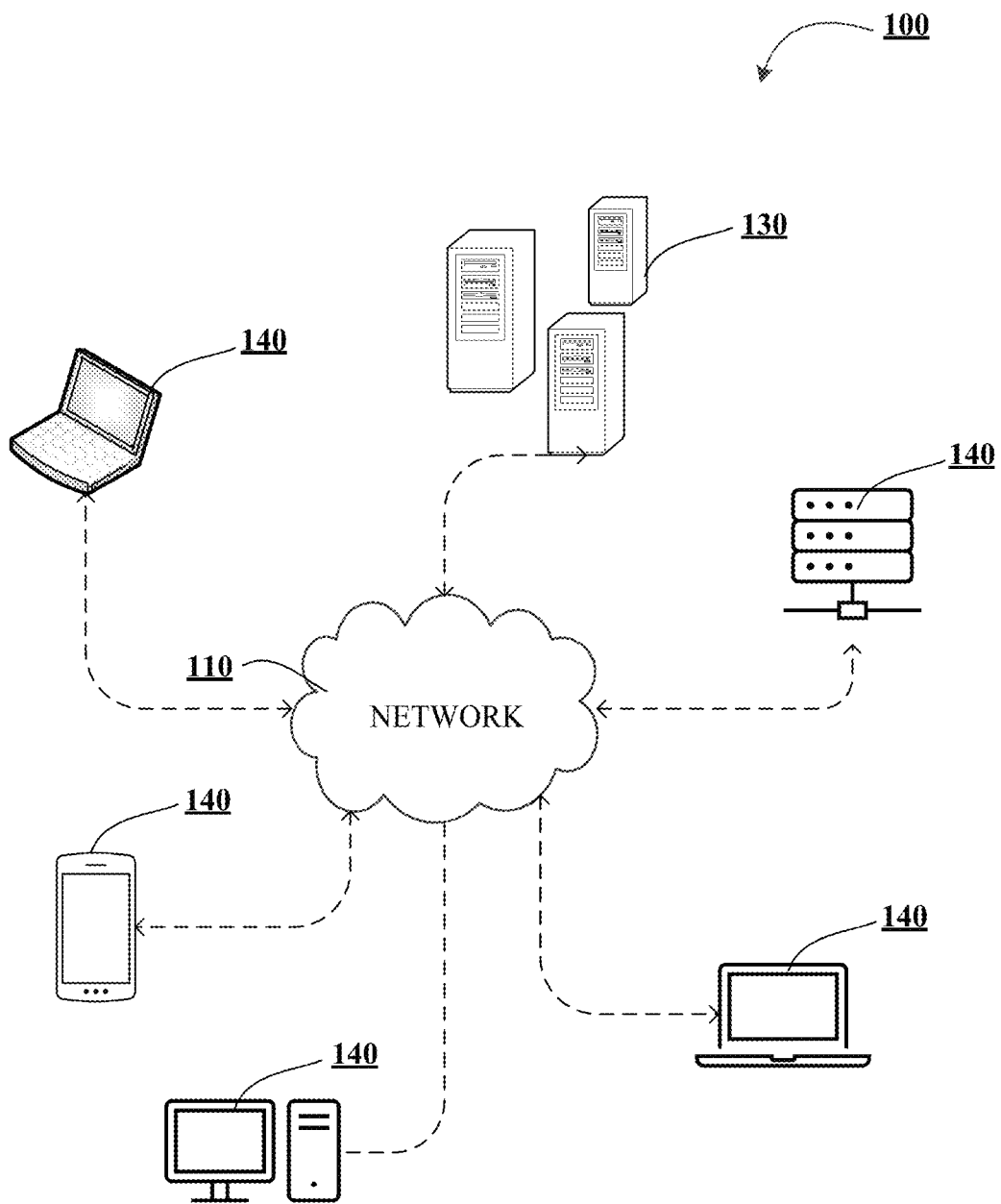
Figure 1B:
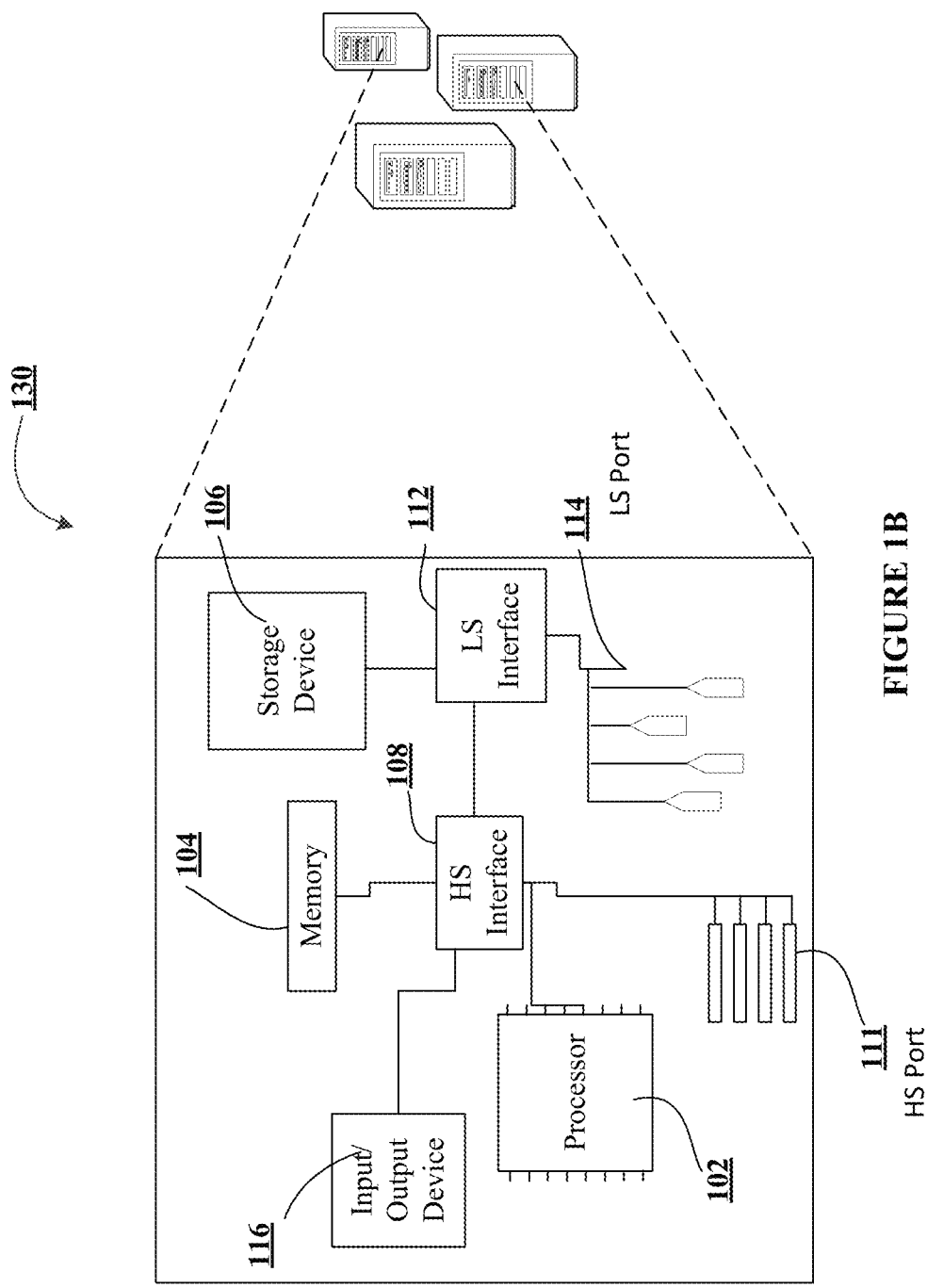
Figure 1C:
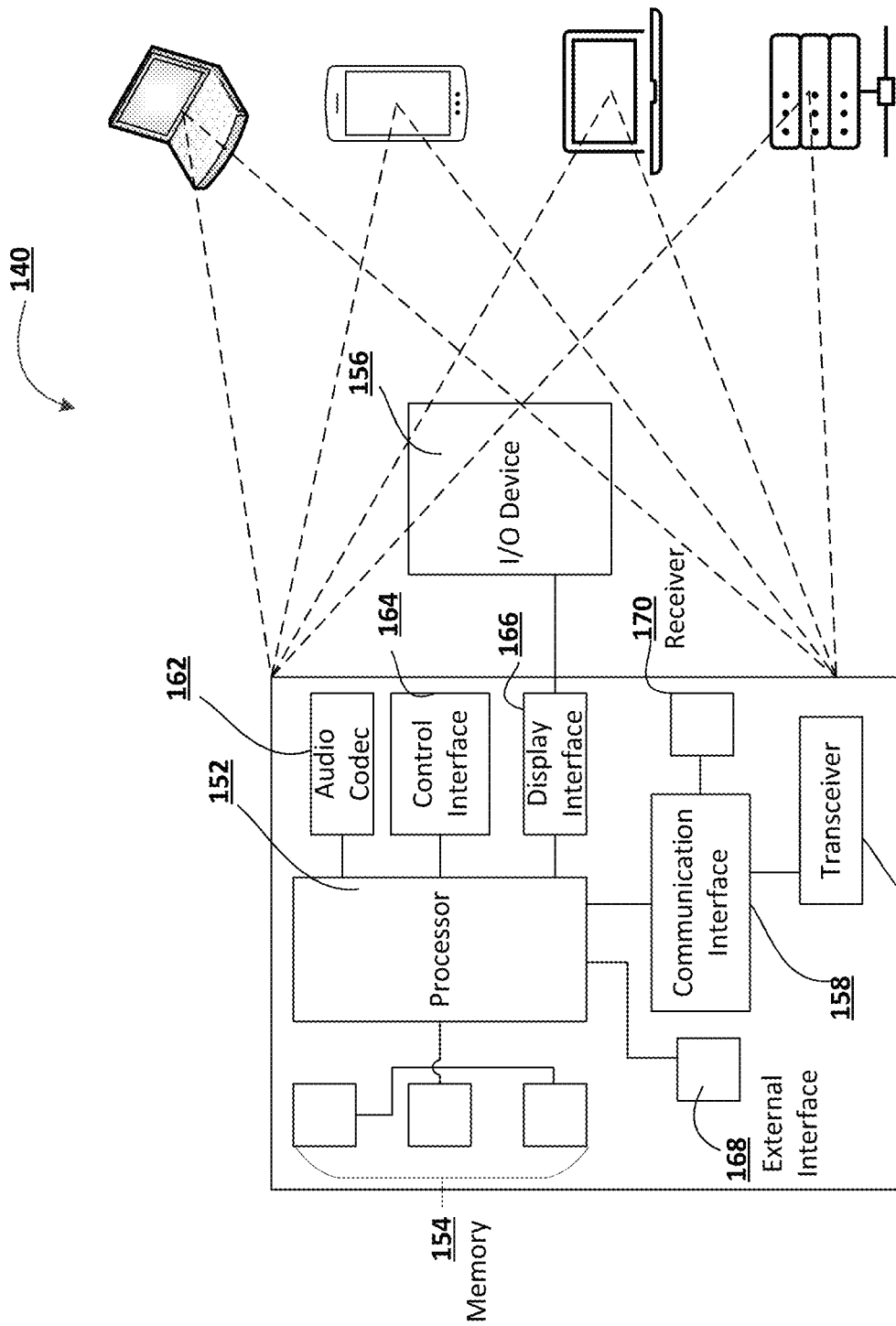
Figure 2:
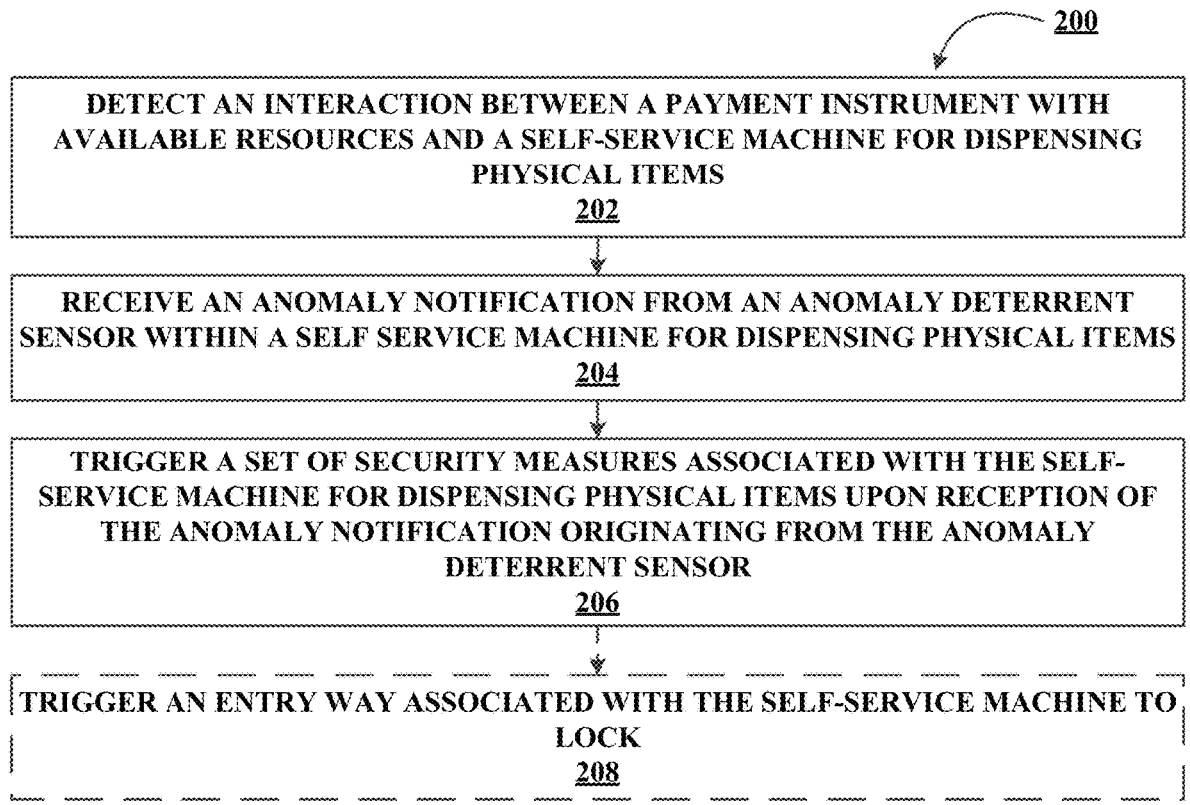

FIGS. 1A-1C illustrates technical components of an exemplary distributed computing environment for using an anomaly deterrent sensor within a self-service machine for dispensing physical items, in accordance with an embodiment of the disclosure; and FIG. 2 illustrates a process flow for using an anomaly deterrent sensor within a self-service machine for dispensing physical resources in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Self-service machines for dispensing physical items may enable distribution of physical items as requested and contain physical items such as resources that may be withdrawn. The containment of said physical items may be protected by the self-service machine and subjected to numerous security measures to ensure physical items are distributed as intended. While the self-service machine may be designed to dispense the physical items, unintended dispersion due to anomalies and malicious intent may use a variety of security measures implemented to secure said physical items.

The subjugation of the self-service machine to transaction reversal anomalies are another form of malicious intent that may cause unintended dispersion of physical items within the self-service machine. The payment instrument approved for usage within the self-service machine may interact with the self-service machine while physical manipulation of the self-service machine is conducted. The self-service machine may then dispense physical resources while incorrectly assuming that resources have not been properly dispensed from the payment instrument. This may enable physical items to be distributed from the self-service machine while not deducting resources from the payment instrument. The self-service machine may further be manipulated to dispense physical items while experiencing physical manipulation, deviating from the established procedure of deducting resources from the payment instrument or deducting resources from an account/entity associated with the payment instrument.

Deterrence of transaction reversal anomalies may be accomplished by implementation of a set of security measures that may be enacted after an anomaly is detected by an anomaly deterrent sensor. Said set of security measures may comprise a pre-recorded alarm played to deter the anomaly from occurring, i.e., if the self-service machine is being physically manipulated through the physical item dispensing area within the self-service machine, an anomaly notification may be received causing the prerecorded alarm to be played. Reception of the anomaly notification may trigger other aspects of the set of security measures, comprised of locking an entry way connected to the self-service machine (i.e., locking doors connected to the self-service machine), transmitting a notification to a third party (i.e., sending an alert to law enforcement), and/or activating a camera system within the self-service machine. The set of security measures may be implemented while the anomaly is detected and may be adjusted according to predetermined settings within the self-service machine.

Accordingly, the present disclosure comprises detecting an interaction between a payment instrument with available resources within a self-service machine for dispensing physical items. The self-service machine may be an automated teller machine (ATM) and an anomaly may be physical manipulation of the self-service machine while the payment instrument is interacting with the self-service machine. The anomaly deterrent sensor may detect the anomaly, transmit a notification, then trigger a set of security measures to deter the anomaly (i.e., playing a prerecorded alarm while the anomaly is detected). The set of security measures may further comprise the implementation of locking doors associated with the self-service machine (i.e., doorways leading to the self-service machine may be closed and locked), transmission of a notification to a third party (i.e., law enforcement), and/or activating a camera system associated with the self-service machine. The anomaly deterrent sensor may be a vibrational sensor that detects physical manipulation of the self-service machine and the physical item dispersion area.

What is more, the present disclosure provides a technical solution to a technical problem. As described herein, the technical problem includes anomalies occurring within the self-service machine associated with transaction reversal anomalies. The technical solution presented herein allows for detection and deterrence of said anomalies within the self-service machine. In particular, detection and deterrence of said anomalies is an improvement over existing solutions to transaction reversal anomalies, (i) with an additional security measures implemented to deter anomalies, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for an anomaly deterrent sensor within a self-service machine for dispensing physical items 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for systems, methods, and apparatuses for an anomalies deterrent sensor within a self-service machine for dispensing physical items. In some embodiments, systems, methods, and apparatuses for an anomalies deterrent sensor within a self-service machine for dispensing physical items (e.g., similar to the one or more of the systems described herein with respect to FIGS. 1A-1C) may perform one or more of the steps of process flow 200.

As shown in Block 202, the process flow 200 may include the step of detecting an interaction between the payment instrument with available resources and a self-service machine for dispensing physical items. Detection of the interaction between the payment instrument and the self-service machine may be comprised of a payment card inserted into the self-service machine for dispensing physical resources and subsequent operation of the self-service machine. The payment instrument may enable the transfer of sensitive electronic data through the self-service machine for dispensing physical items and may further directly or indirectly cause the dispersion of said physical items. The payment instrument may be a credit card, debit card, gift card, and/or an identification card capable of accessing services and causing the dispersion of physical items through the self-service machine. "Available resources" within the payment instrument may enable the payment instrument to withdraw, move, transfer, and/or otherwise manipulate physical items within the self-service machine. For instance, the payment instrument may be used in conjunction with the self-service machine to withdraw physical items from the self-service machine using the available resources associated with the payment instrument. If an interaction between the self-service machine and the payment instrument has been detected and an anomaly has not been detected, the self-service machine may deduct the available resources from the payment instrument and dispense physical items accordingly. The payment instrument may be inserted, connected, electronically linked, and/or scanned to perform the interaction with the self-service machine. The link between the payment instrument and the self-service machine may be in place to receive an anomaly notification from the anomaly deterrent sensor.

In some embodiments, the interaction between the payment instrument with available resources and the self-service machine for dispensing physical items may be a withdrawal of physical items from the self-service machine, manipulation of available resources within the payment instrument, and/or a transfer between the self-service machine and the payment instrument. The interaction may at least partially enable distribution of physical items within the self-service machine. For instance, the payment instrument may initiate a withdrawal process wherein resources associated with the payment instrument may be deducted from the payment instrument in exchange for physical items. The process in which the distribution of the physical items from the self-service machine may occur may create conditions in which the self-service machine may experience anomalies.

As shown in Block 204, the process flow 200 may include the step of receiving an anomaly notification from an anomaly deterrent sensor within a self-service machine for dispensing physical items. An anomaly notification may be a signal, message, indication, and/or transmission indicating an anomaly within the self-service machine originating from an anomaly deterrent sensor. The anomaly notification may indicate that an anomaly associated with the self-service machine is occurring and may signal/induce actions to deter said anomaly, which may be described in greater detail below.

An anomaly detected by the anomaly deterrent sensor within the self-service machine may be a transactional reversal anomaly. A transaction reversal anomaly may be comprised of using the payment instrument (approved for usage within the self-service machine) with available resources to begin accessing the physical items within the self-service machine. Accessing the physical items may be achieved with physical manipulation/forced entry into the self-service machine through the physical item dispensing area within the self-service machine. For instance, a transaction may be initiated through the self-service machine, and outside physical manipulation/forced entry of the self-service machine may be detected by the anomaly deterrent sensor. Forced entry of the self-service machine may include manipulation of the physical item dispensing area within the self-service machine for dispensing physical items. In other words, the self-service machine may be physically altered, changed, and/or experience an anomaly that may cause the dispensing process of the physical item to deviate from established procedure. In other words, physical manipulation of the self-service machine for dispensing physical items from the physical item dispensing area may cause removal of the physical items from the self-service machine, but the self-service machine may process the removal as unprocessed/a failure to dispense physical items. The anomaly experienced may further cause the self-service machine to fail to deduct the available resources from the payment instrument. This anomaly dispenses resources/physical items due to malicious activity and may be deterred through detection of the anomaly by the anomaly deterrent sensor and subsequent security measures implemented.

In some embodiments, the self-service machine for dispensing physical items may be an automatic teller machine (ATM), and may be involved in resource transfers, resource distributions, or resource allocation as described previously. Similarly, the physical items dispensed through the self-service machine may be a form of a resource transfer between a user and the self-service machine. The physical items dispensed by the self-service machine may further be a form of resources, currency, and/or cash as described previously. The physical items dispensed by the self-service machine and the transfer of said physical items may experience anomalies described herein, which may be detected by the anomaly deterrent sensor.

In some embodiments, the physical item dispensing area within the self-service machine may be a designated area wherein physical items may be dispensed, exchanged, received, distributed, and/or interacted with. The physical item dispensing area may further be comprised of areas within the self-service machine that process, store, and otherwise function in association with the physical items dispensed by the self-service machine. The anomaly deterrent sensor may be associated with/triggered by actions, changes, and/or deviations from established procedure within the self-service machine, as described in greater detail below.

In some embodiments, the anomaly deterrent sensor may be a sensor connected to, placed within, and/or monitoring the self-service machine for dispensing physical items. The anomaly deterrent sensor may be a sensor capable of detecting forced entry/physical manipulation of the self-service machine for dispensing physical items. The anomaly deterrent sensor may be an optical sensor monitoring the physical item dispensing area (i.e., the optical sensor may be triggered if movement is detected going into the physical item dispensing area, as established operations entail movement in the direction away from the physical item dispensing area), a metallic sensor (i.e., if a metallic tool (such as a crowbar) is used to physical manipulate the self-service machine and/or the physical item dispensing area), a vibrational sensor (i.e., if physical manipulation causes vibration which may be detected by said sensor), a thickness sensor (i.e., if the physical distance between plates that may create the entry way of the physical item dispensing area change/move beyond a certain distance the sensor may be triggered), or sensors installed within the self-service machine for dispensing physical items. The anomaly deterrent sensor may further be comprised of multiple sensors to detect an anomaly. For instance, an anomaly may be detected if the vibrational sensor and thickness sensor are triggered which may indicate an anomaly is occurring which may trigger the set of security measures to be implemented. The anomaly deterrent sensor may detect anomalies (i.e., transaction reversal anomalies) and may deter anomalies in process through a set of security measures described in greater detail below.

In some embodiments, forced entry into the self-service machine for dispensing physical items may be attempts to alter, manipulate, change, deceive, and/or disrupt the routine operations of the self-service machine for dispensing physical items. Forced entry into the self-service machine for dispensing physical items may be comprised of unauthorized access, outside interference, and/or malicious intent directed towards the self-service machine. For instance, the use of a crowbar to access the inner workings of an ATM (i.e., the self-service machine for dispensing physical items)

through the resource dispensing slot (i.e., the physical item dispensing area) may be considered forced entry, and may trigger the anomaly deterrent sensor within the ATM.

As shown in Block 206, the process flow 200 may include the step of triggering a set of security measures associated with the self-service machine for dispensing physical items upon reception of the anomaly notification originating from the anomaly deterrent sensor. Triggering the set of security measures may comprise playing a prerecorded alarm from the self-service machine for dispensing physical items while the self-service machine experiences forced entry into the physical item dispensing area. The prerecorded alarm may be a sound, recording, alert, warning, noise, and/or audible deterrent of a predetermined pitch, length, and volume used to signal that forced entry into the self-service machine through the physical item dispersion area may be in progress. The prerecorded alarm may be played to deter the forced entry into the self-service machine and/or to alert by-standers that a forced entry into the self-service machine is in progress, and/or to draw attention to the forced entry. The prerecorded alarm may further be played in conjunction with security measures described in greater detail below.

As shown in Block 208, the process flow 200 may include the step of triggering an entry way associated with the self-service machine to lock. For instance, if the self-service machine may be connected to a set of doors that can be controlled by the self-service machine. The set of doors used to access the self-service machine may close and become locked if the set of security measures have been triggered. The set of doors connected to the self-service machine may be an access point to the self-service machine and may contain/prevent the source of the forced entry/detected anomaly to remain with the self-service machine. The set of doors may remain closed and locked until a predetermined trigger is activated to unlock the set of doors. The predetermined trigger may be activated based on settings associated with the functions of the self-service machine, the arrival of a third party, or the transmission of a signal/notification received by the self-service machine that unlocks the set of doors. Access to and control of the set of doors connected to the self-service machine may further deter and prevent anomalies occurring due to malicious intent.

In some embodiments, the set of security measures further comprises transmitting a notification regarding forced entry of the self-service machine for dispensing physical items to a third party. Transmission of the notification may be a message, alert, indicator, and/or the like that may indicate that the self-service machine is experiencing an anomaly/forced entry. The transmitted notification may comprise the location of the self-service machine, the time in which the anomaly was detected, a picture/video/recording taken by the self-service machine and/or cameras associated with the self-service machine, and/or a description of the anomaly/forced entry. The third party to which the notification may be transmitted to may be an entity associated with the self-service machine, a group associated with security of the self-service machine, and/or authorities associated with preventing malicious activity (i.e., law enforcement).

In some embodiments, the set of security measures further comprises activating a camera system associated with the self-service machine. The camera system associated with the self-service machine may be within the self-service machine, connected to the self-service machine, and/or set up to monitor and record the self-service machine and the operations conducted therein. For instance, the self-service machine may have a camera system that may record malicious activity and potential anomalies, with said camera system contained within the self-service machine. In another instance, the camera system may be outside of the self-service machine but directed towards the self-service machine and the physical item dispensing area (i.e., the camera system may be placed outside of the self-service machine and able to record malicious activity/anomalies from another vantage point). Connection between the camera system and the self-service machine may be a wireless connection. The camera system may further take photographs, video, and/or sound recordings of self-service machine and the surrounding area associated with the self-service machine.

In some embodiments, the set of security measures are reset upon detection of a change found through the camera system. The camera system may enable identification of the source of the anomaly after the anomaly notification has been received and may continue the set of security measures while the source of the anomaly is detected (i.e., the prerecorded alarm may continue to sound, and the camera system may continue to record while the source of the anomaly is detected). The source of the anomaly may be detected through the anomaly deterrent sensor and/or the camera system, and the set of security measure may continue to be implemented while the source of the anomaly is detected. In other words, if an anomaly is occurring due to an individual, the camera system may detect the individual and continue to record while the individual is detected. The camera system may also continue to record based on the anomaly deterrent sensor (i.e., while the anomaly deterrent sensor detects an anomaly, the camera system may continue to record). The set of security measures may further continue to be implemented on a predetermined length of time after the source of the anomaly is no longer detected. For instance, if the anomaly deterrent sensor no longer detects an anomaly/forced entry into the physical item dispensing area and the camera system can no longer detect the source of the anomaly, the set of security measures may remain in operation for two minutes after the source of the anomaly is no longer detected.

In some embodiments, the set of security measures are implemented for a predetermined length of time after being triggered by the reception of the anomaly notification from the anomaly deterrent sensor within the self-service machine for dispensing physical items. For instance, after the anomaly notification is received and the set of security measures associated with the self-service machine have been triggered, the set of security measures may be implemented for a predetermined length of time after receiving the notification. I.e., the set of security measures may be implemented on a timer of 15 minutes after reception of the anomaly notification. Aspects of the set of security measures may be implemented for adjustable lengths of time. For instance, the pre-recorded alarm may be played for 5 minutes while the camera system may be activated for 10 minutes. Similarly, aspects of the set of security measures may be implemented based on adjustable predetermined settings. In other words, the set of security measures may be implemented while the camera system within the self-service machine detects an anomaly is in progress, the anomaly deterrent sensor detects the anomaly is occurring, and/or a combination of such that decides which aspects of the set of security measures are implemented and for the length of time each aspect is implemented.

In some embodiments, the prerecorded alarm may be a deterrent to anomalies occurring in the self-service machine. The deterrent may use the prerecorded alarm to indicate that a third party (i.e., law enforcement) has been called, deterring the source of the anomaly to cease or leave the self-service machine. The alarm may play at a predetermined volume to indicate to bystanders near the self-service machine that the anomaly is ongoing and encourage further attention to the self-service machine while the anomaly is occurring to deter future anomalies.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for using an anomaly deterrent sensor within a self-service machine for dispensing physical items, the system comprising:
    at least one non-transitory storage device; and
    at least one processing device coupled to the at least one non-transitory storage device, wherein the at least one processing device is configured to:
        detect an interaction between a payment instrument with available resources and a self-service machine for dispensing physical items;
        receive an anomaly notification from an anomaly deterrent sensor within the self-service machine for dispensing physical items,
        wherein the anomaly notification is associated with forced entry into the self-service machine for dispensing physical items,
        wherein the anomaly deterrent sensor detects forced entry into a physical item dispensing area within the self-service machine for dispensing physical items during the interaction between the payment instrument and the self-service machine; and
        trigger a set of security measures associated with the self-service machine for dispensing physical items upon reception of the anomaly notification originating from the anomaly deterrent sensor,
        wherein the set of security measures comprises playing a pre-recorded alarm from the self-service machine for dispensing physical items after reception of the anomaly notification from the anomaly deterrent sensor.

2. The system of claim 1, wherein the set of security measures further comprises triggering an entry way associated with the self-service machine to lock.

3. The system of claim 1, wherein the set of security measures further comprises transmitting a notification regarding forced entry of the self-service machine for dispensing physical items to a third party.

4. The system of claim 1, wherein the set of security measures further comprises activating a camera system associated with the self-service machine.

5. The system of claim 4, wherein the set of security measures are reset upon detection of a change found through the camera system.

6. The system of claim 4, wherein the set of security measures are implemented for a predetermined length of time after being triggered by reception of the anomaly notification from the anomaly deterrent sensor within the self-service machine.

7. The system of claim 1, wherein the anomaly deterrent sensor is comprised of a vibrational sensor.

8. A computer program product for using an anomaly deterrent sensor within a self-service machine for dispensing physical items, the computer program product comprising a non-transitory computer-readable medium comprising code causing an apparatus to:
    detect an interaction between a payment instrument with available resources and a self-service machine for dispensing physical items;
    receive an anomaly notification from an anomaly deterrent sensor within the self-service machine for dispensing physical items,
    wherein the anomaly notification is associated with forced entry into the self-service machine for dispensing physical items,
    wherein the anomaly deterrent sensor detects forced entry into a physical item dispensing area within the self-service machine for dispensing physical items during the interaction between the payment instrument and the self-service machine; and
    trigger a set of security measures associated with the self-service machine for dispensing physical items upon reception of the anomaly notification originating from the anomaly deterrent sensor,
    wherein the set of security measures comprises playing a pre-recorded alarm from the self-service machine for dispensing physical items after reception of the anomaly notification from the anomaly deterrent sensor.

9. The computer program product of claim 8, wherein the set of security measures further comprises triggering an entry way associated with the self-service machine to lock.

10. The computer program product of claim 8, wherein the set of security measures further comprises transmitting a notification regarding forced entry of the self-service machine for dispensing physical items to a third party.

11. The computer program product of claim 8, wherein the set of security measures further comprises activating a camera system associated with the self-service machine.

12. The computer program product of claim 11, wherein the set of security measures are reset upon detection of a change found through the camera system.

13. The computer program product of claim 11, wherein the set of security measures are implemented for a predetermined length of time after being triggered by reception of the anomaly notification from the anomaly deterrent sensor within the self-service machine.

14. The computer program product of claim 8, wherein the anomaly deterrent sensor is comprised of a vibrational sensor.

15. A method for using an anomaly deterrent sensor within a self-service machine for dispensing physical items, the method comprising:
- detecting an interaction between a payment instrument with available resources and a self-service machine for dispensing physical items;
- receiving an anomaly notification from an anomaly deterrent sensor within the self-service machine for dispensing physical items,
  wherein the anomaly notification is associated with forced entry into the self-service machine for dispensing physical items,
  wherein the anomaly deterrent sensor detects forced entry into a physical item dispensing area within the self-service machine for dispensing physical items during the interaction between the payment instrument and the self-service machine is detected; and
- triggering a set of security measures associated with the self-service machine for dispensing physical items upon reception of the anomaly notification originating from the anomaly deterrent sensor,
  wherein the set of security measures comprises playing a pre-recorded alarm from the self-service machine for dispensing physical items after reception of the anomaly notification from the anomaly deterrent sensor.

16. The method of claim 15, wherein the set of security measures further comprises triggering an entry way associated with the self-service machine to lock.

17. The method of claim 15, wherein the set of security measures further comprises transmitting a notification regarding forced entry of the self-service machine for dispensing physical items to a third party.

18. The method of claim 15, wherein the set of security measures further comprises activating a camera system with the self-service machine.

19. The method of claim 18, wherein the set of security measures are implemented for a predetermined length of time after being triggered by reception of the anomaly notification from the anomaly deterrent sensor within the self-service machine.

20. The method of claim 15, wherein the anomaly deterrent sensor is comprised of a vibrational sensor.

* * * * *